June 30, 1925.
S. P. GRIFFIN
1,544,448
HOUSE MOVING TRUCK
Filed Aug. 6, 1924
4 Sheets-Sheet 3
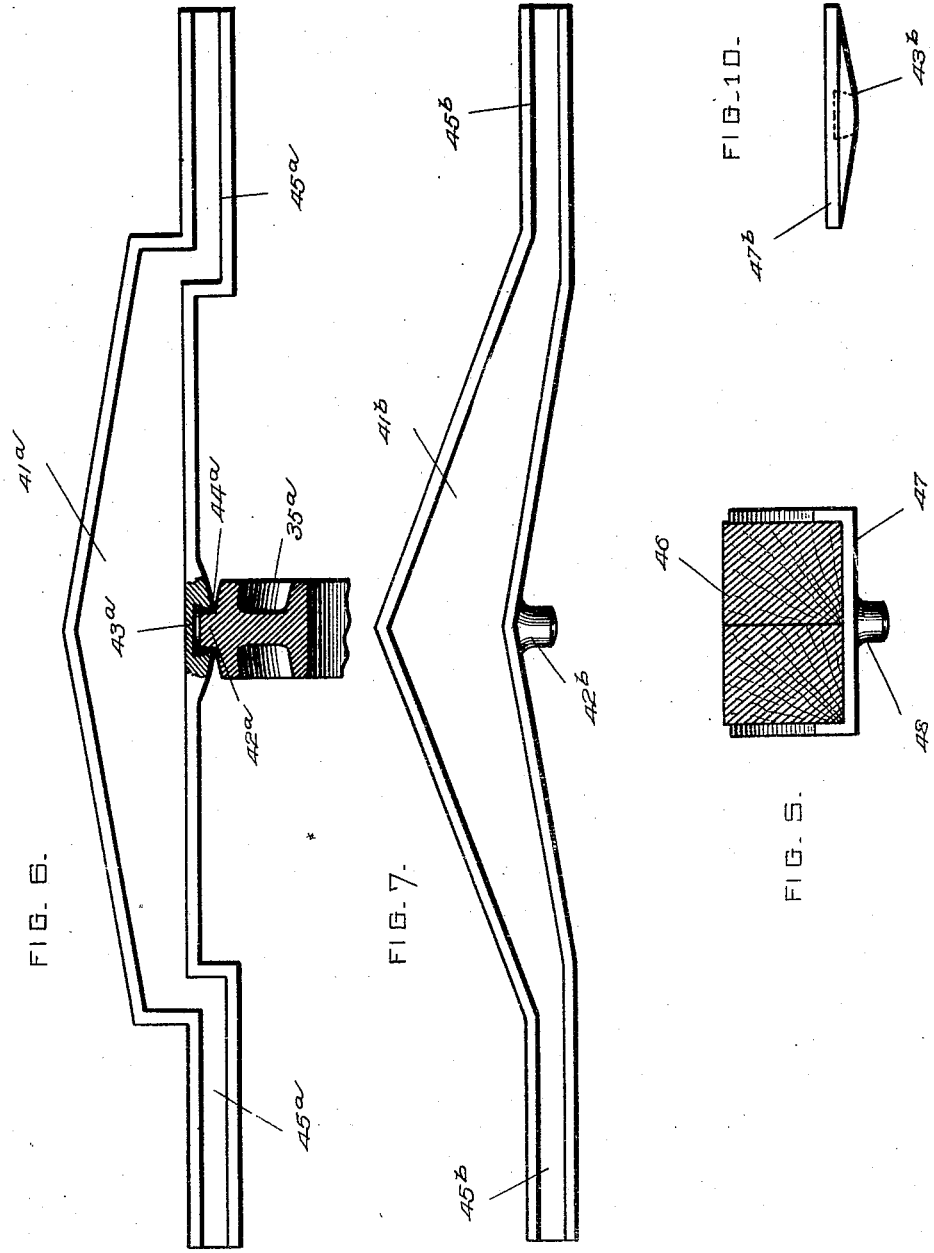
Inventor:
S. P. GRIFFIN,
By Monroe E. Miller
Attorney.

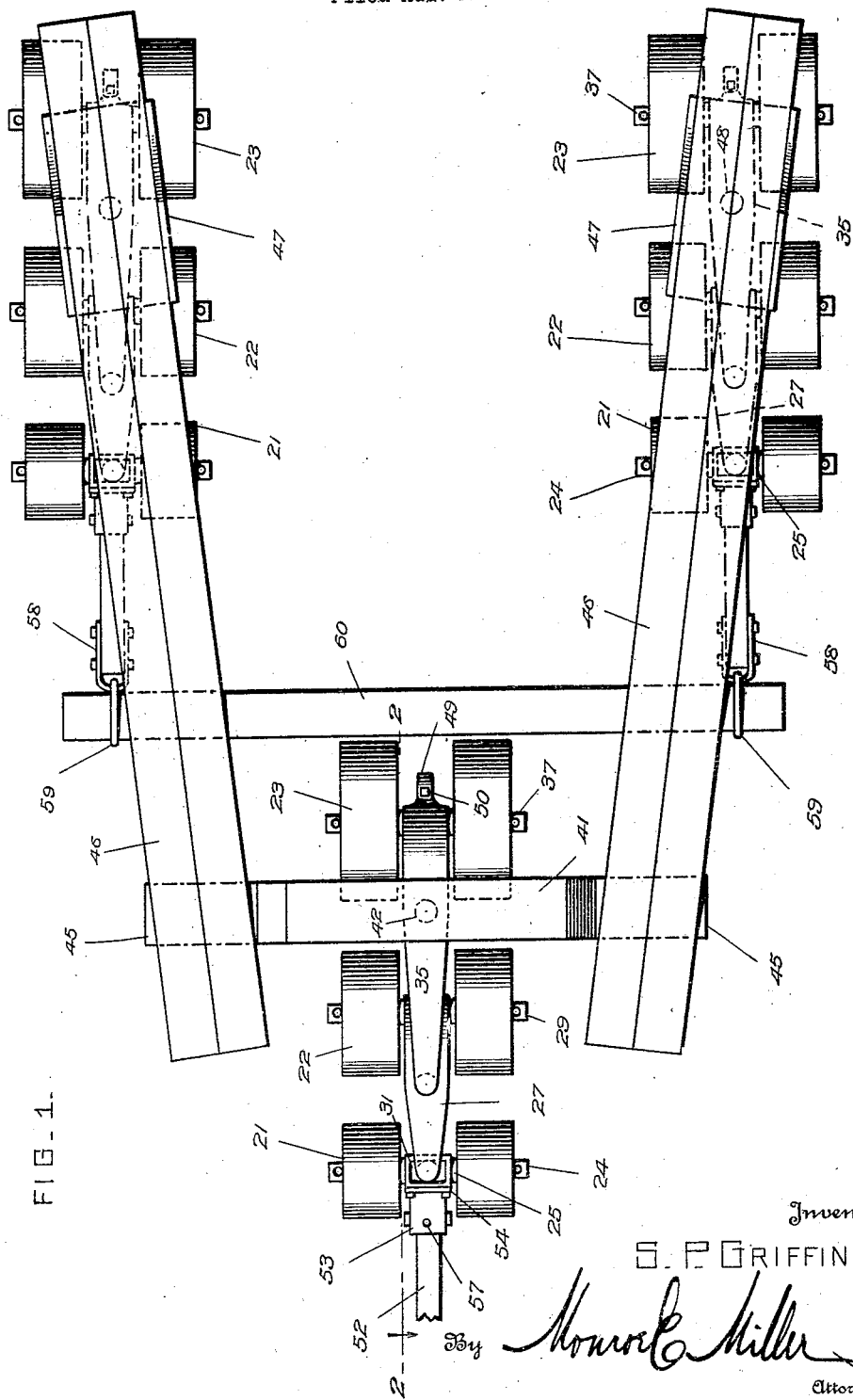

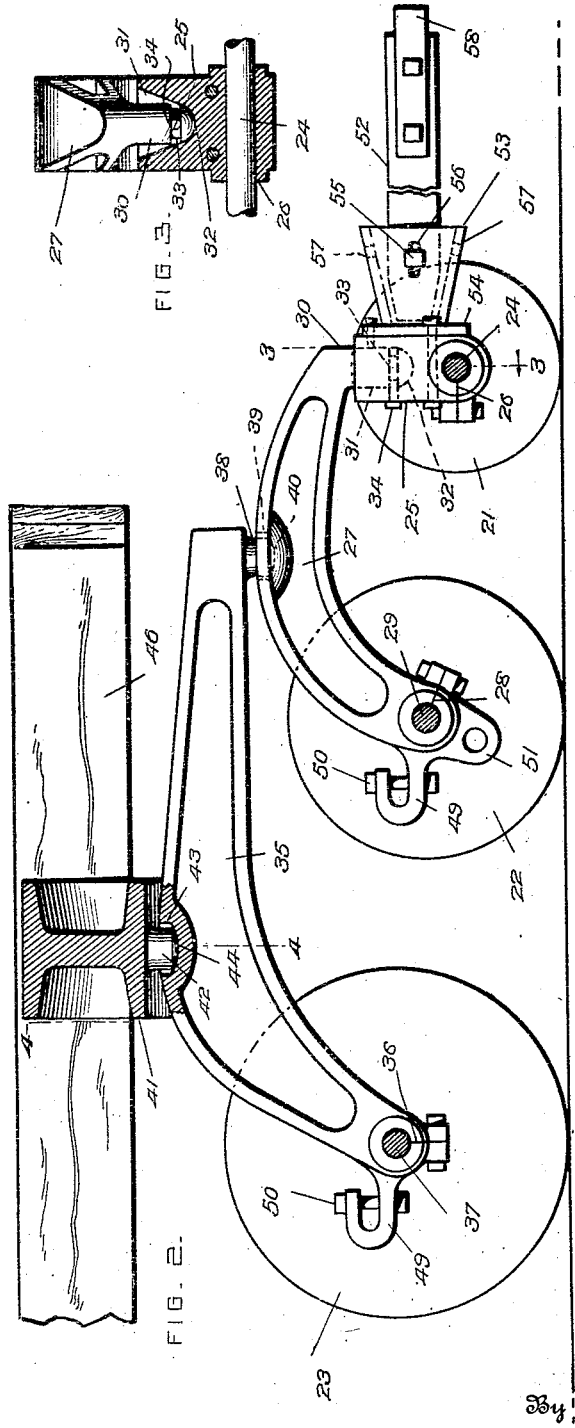

June 30. 1925.
S. P. GRIFFIN
1,544,448
HOUSE MOVING TRUCK
Filed Aug. 6. 1924 4 Sheets-Sheet 4
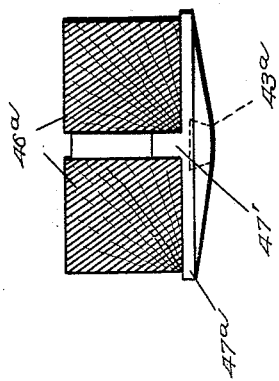
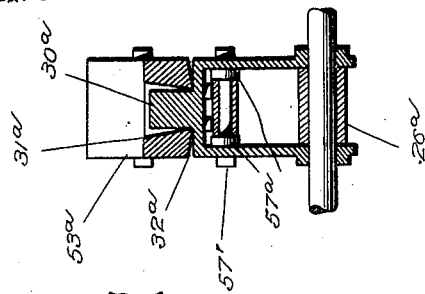
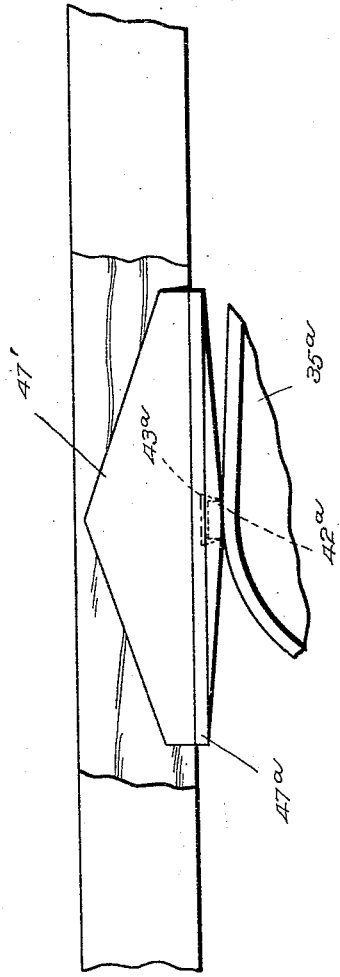
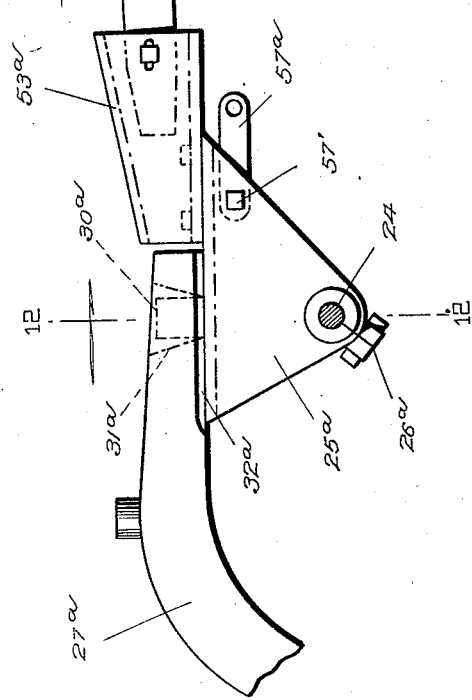
Inventor:
S. P. GRIFFIN,
By Monroe E. Miller
Attorney.

Patented June 30, 1925.

1,544,448

UNITED STATES PATENT OFFICE.

SAMUEL P. GRIFFIN, OF ORLANDO, FLORIDA.

HOUSE-MOVING TRUCK.

Application filed August 6, 1924. Serial No. 730,432.

*To all whom it may concern:*

Be it known that I, SAMUEL P. GRIFFIN, a citizen of United States, residing at Orlando, in the county of Orange and State of Florida, have invented certain new and useful Improvements in House-Moving Trucks, of which the following is a specification, reference being had therein to the accompanying drawing.

The present invention relates to trucks such as are used for moving houses, buildings and other large objects, and it is an object of the invention to provide house moving trucks having novel and improved features of construction to enhance the utility and efficiency thereof.

Another object is the provision of a truck of the character indicated including three pairs of wheels and novel means for connecting said pairs of wheels to permit of flexing action between the pairs of wheels, for purpose of steering and to accommodate irregularities in the surface travelled over, and such means also distributing the weight or pressure in predetermined proportions to the pairs of wheels.

A further object is the provision of a novel connection between the first and second pair of wheels, and for the connection of a tongue to the first pair of wheels, to permit the first or front pair of wheels to be angled for purpose of steering about a vertical axis and to enable said wheels to move vertically relatively to one another when passing over obstructions on or ruts in the road or surface travelled over, without other relative movements of the two pairs of wheels that might be objectionable.

The invention has for another object the improvement of the construction generally in its details and arrangement of parts, so as to increase the efficiency and practicability of the device.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a plan view of a set of house moving trucks and timbers supported thereby for carrying the house, building or other object.

Fig. 2 is an enlarged longitudinal section on the line 2—2 of Fig. 1 showing the front truck.

Fig. 3 is an enlarged sectional detail on the line 3—3 of Fig. 2.

Fig. 4 is a section on the line 4—4 of Fig. 2.

Fig. 5 is an end view of the timber carrier or supporting member of one of the rear trucks showing the timber in cross section.

Fig. 6 is an elevation of a modified form of cross beam and a modified form of pivot joint.

Fig. 7 is a side elevation of another form of cross beam.

Fig. 8 is a side elevation showing another form of timber carrier or supporting member for the rear trucks.

Fig. 9 is an end view of the carrier or supporting member shown in Fig. 8, showing the timbers in cross section.

Fig. 10 is an elevation of still another form of carrier or supporting member.

Fig. 11 is a side elevation illustrating modifications in the means for connecting the first and second pair of wheels with one another and for connecting the tongue with the first pair of wheels.

Fig. 12 is a section on the line 12—12 of Fig. 11.

As shown in Fig. 1 there is a front truck and two rear trucks, and such trucks are of the same construction so that they can be used interchangeably. Each truck has three pairs of wheels 21, 22 and 23, which are of increasing diameters from the front or first wheels rearward, as seen in Figs. 1 and 2. These wheels can be of wood, metal, or other suitable material, and may have rubber or cushion tires to avoid injury to road surfaces, planks, pavements and other surfaces over which the trucks travel.

The first or front wheels 21 and second or intermediate wheels 22 of each truck are connected to permit the wheels 21 to be angled about a vertical axis for purpose of steering and to also permit the axle 24 of said front wheels 21 to oscillate in the vertical plane of said axle. Thus, a block or member 25 of suitable metal is disposed between the wheels 21 and is formed with a pinch clamp 26 embracing the axle 24. The wheels 21 are rotatable upon the axle 24, and the member 25 projects upwardly from said axle. An arched beam 27 is formed at its rear end with a pinch clamp 28 embracing the axle 29, on which the wheels 22 are mounted for rotation, with the beam 27 between said wheels 22, and the forward end of the beam 27 has a swivel and oscillatory connection with the member 25. Thus, the forward end of the beam 27 is formed with a depending pivot stud 30 entering a recess 31 in the upper end of the member 25. The lower end of the stud 30 and bottom of the recess 31 are hemi-spherical and fitted together snugly to permit the member 25 to turn about the vertical axis of the stud 30. The front and rear walls of the recess 31 are parallel and vertical so as to bear snugly against the front and rear sides of the stud 30, thereby preventing the member 25 from oscillating forwardly and rearwardly relatively to the stud 30, but the recess 31 has its side walls diverging upwardly, as seen in Fig. 3, thereby permitting the member 25 to oscillate transversely. This will permit the axle 24 to oscillate in the vertical plane thereof, so that the wheels 21 can move upwardly and downwardly in passing over obstructions on or through ruts in the surface over which the wheels travel.

The beam 27 and member 25 are held assembled by the provision of an annular groove 33 in the stud 30 located in the horizontal plane of the center of curvature of the end of the stud, and a set screw 34 or other retaining element is engaged into the rear portion of the member 25 and projects into said grooves 33. Said set screw or element 34 is located in the axis of oscillation of the axle 24 and member 25 when said axle is oscillated in the vertical plane thereof, so that the member 25 can have simultaneously movements about the axes of the stud 30 and retaining element 34. In other words, the axle 24 can turn with the member 25 about the vertical axis of the stud 30, for purpose of steering, and, at the same time, the member 25 can oscillate transversely when the wheels move over irregularities in the surface traversed by the wheels. The groove 33 and retaining element 34 are especially desirable to prevent the member 25 and beam 27 from becoming separated when the truck is hauled about when not in use, without a load thereon, thus preventing the beam 27 from jumping out of engagement with the member 25.

The front wheels 21 can be angled with the member 25 about the vertical axis of the stud 30, and said wheels can move under the beam 27 when the axle 24 is turned to a longitudinal position.

The third or rear pair of wheels 23 are connected by a beam 35 with the beam 27, to permit the beam 27 to turn relatively to the beam 35 about a vertical axis and to permit the beam 27 to oscillate in different directions relatively to the beam 35. The rear end of the beam 35 is formed with a pinch clamp 36 tightly embracing the axle 37 on which the rear wheels 23 are mounted for rotation, with the beam 35 located between said wheels 23. The clamps 26, 28 and 36 have bosses at their opposite ends for spacing the wheels from the member 25 and beams 27 and 35, and by using such member and beams the wheels of each pair can be located closely together, so that the construction is strong and compact.

The forward end of the beam 35 projects over the beam 27 and is formed with a depending pivot stud 38 entering a recess 39 formed in the crest of the beam 27 between the ends of said beam. The beam 27 curves downwardly from the stud 38 and recess 39 to the forward and rear ends of said beam 27. The stud 38 and side wall of the recess 39 are of cylindrical form with the recess of larger diameter than the stud so that the stud can have horizontal movements in the recess in different directions. The end of the stud 38 and bottom of the recess 39 have the convexed and concaved surfaces 40 fitting snugly together, to permit the beam 27 to oscillate in different directions relatively to the beam 35 as the wheels 21 and 22 pass over irregularities on the surface travelled over. The beam 27 can also shift bodily longitudinally or transversely relatively to the beam 35 until the stud 38 comes into contact with the side wall of the recess 39. The sides of the stud 38 and wall of the recess being vertical will limit the relative movement of the beams, without the possibility of the stud 38 jumping out of the recess 39, and the flexing movement thus permitted will enable the beams and wheels to conform to uneven surfaces, and the beams can shift longitudinally and transversely relatively to one another as well as being capable of relative oscillation.

Each truck has a carrier or supporting member on the beam 35, and different carriers or supporting members can be used for the front and rear trucks and for different conditions. As shown in Figs. 1, 2 and 4, the carrier or supporting member for the front truck is a cross beam 41 of metal and I-shaped cross section. The beam or carrier 41 is formed intermediate its ends with a depending pivot stud 42, similar to the stud 38, which is seated in a recess 43 in the crest of the beam 35. The recess 43 is of larger diameter than the stud 42, and the end of the stud and bottom of the recess are convexed and concaved, as at 44, so that the beam or carrier 41 can have the same movements relatively to the beam 35 that the beam 35 has relatively to the beam 27. The beam or carrier 41 can shift longitudinally and transversely relatively to the beam 35 as well as to oscillate in different directions. The terminals of the beam 41 are offset downwardly, as at 45, to support the timbers 46 which support the house, building or other object. By offsetting the terminals 45 downwardly, the supporting surfaces thereof are located in a horizontal plane just slightly above the beam 35, thereby enabling the forward ends of the timbers 46 to be located in the same horizontal plane as the rear ends thereof which are supported by the rear trucks, as will presently appear. Also, by offsetting the terminals 45 of the beam 41 this will reduce to a minimum the tendency for the beam 41 to be tilted by torsional strain when the beam 35 is pulled to transmit the pull to the beam 41 by way of the stud 42, inasmuch as the terminals 45 are close to the horizontal plane of the point of contact between the beams 35 and 41.

The carriers or supporting members 47 of the rear trucks are of channel shape so as to receive the timbers 46 between the upstanding flanges thereof, and said carriers or members 46 can have depending central pivot studs 48 to seat in the recesses 43 of the beams 35 of the rear trucks. It will be apparent that the beam 41, carriers 47 and other carriers or supporting members having depending pivot studs, similar to the studs 42 and 48, can be used interchangeably on the beams 35 of the several trucks. Furthermore, the wheels 21 and 22 of each truck can be used without the wheels 23, by removing the beam 35 from the beam 27, and the beam 41, carriers or members 47, and other interchangeable carriers can be placed on the beams 27 inasmuch as the recesses 39 are of the same formation as the recesses 43 so as to receive the pivot studs 42 and 48. It is thus possible to use the carriers or supporting members on the beams 27 as well as the beams 35, with either two or three pairs of wheels for each truck.

The rear ends of the beams 27 and 35 are provided with rearwardly extending hooks 49 by means of which the trucks can be hitched together, one behind the other, for hauling the trucks from one place to another in a train, and bolts or pins 50 are engageable downwardly through apertures in the hooks 49 to hold the parts coupled together. The rear end of each beam 27 has a depending apertured ear 51 for the connection of a chain, cable or rope to be used for pulling the rear end of the beam 27, such as for purpose of steering or to apply a strain at this point of the truck for other reasons.

A forwardly extending tongue 52 is connected to the member 25 of each truck. Thus, the rear terminal of the tongue is disposed within a forwardly extending socket 53 carried by a plate 54 which is fastened by bolts or otherwise to the front side of the member 25. The side walls of the socket 53 are vertical and the tongue is disposed snugly between said side walls so that the tongue 52 and member 25 will turn one with the other about the vertical axis of the stud 30. The top and bottom of the socket 53 diverge forwardly, to permit of up and down swinging movement of the tongue in the socket if so desired. A bolt 55 or other securing element extends transversely through the side walls of the socket and through the tongue, for pivotally connecting the tongue with the socket, and the side walls of the socket have longitudinal slots 56 in which the bolt 55 is slidable to permit of limited forward and rearward movement of the tongue relatively to the member 25. The vertical and longitudinal movements of the tongue relatively to the member 25 will permit of flexing action that may be essential under some conditions, although the tongue can be secured firmly in the socket 53, if desired, without any freedom of movement between the tongue and member 25. The top and bottom of the socket 53 have apertures 57 near the forward end of the socket for the connection of a cable, rope, chain or other flexible element which is connected to the truck for pulling same, it being preferable to connect the flexible element through the lower aperture 57 so that the power is applied in an effective manner directly in front of the axle 24. A stirrup 58 or other coupling member is secured on the forward terminal of the tongue 52 of each truck.

The stirrups 58 of the rear trucks, as seen in Fig. 1, engage bands 59 that embrace a cross timber 60 extending below the timbers 46, so that the rear trucks are trailed from the timber 60. By having the tongues 52 of the rear trucks slidable and capable of vertical oscillation in the sockets, this will permit the front wheels 21 of the rear trucks to move upwardly and downwardly over uneven surfaces without the parts binding or breaking between the timber 60 and the rear trucks. The timbers 46 may be either single or double timbers.

Fig. 6 shows a cross beam 41$^a$ having the downwardly offset terminals 45$^a$, with square angles at the offsets, whereas the offsets of the beam 41 shown in Fig. 4 are inclined or oblique. A modified swivel joint is also shown. Thus, the beam 35$^a$ has an upstanding pivot stud 42$^a$ and the beam 41 has a lower recess 43$^a$ receiving the stud, said recess being of inverted conical form or increasing in diameter upwardly to permit the beams to oscillate in different directions relatively to one another, and the contacting portions 44ᵃ of the beams are convexed so as to rock against one another, with the end of the stud 42ᵃ spaced from the beam 41ᵃ.

Fig. 7 shows a beam 41ᵇ which has its opposite halves diverging from the center to the terminals 45ᵇ. The beam 41ᵇ has a pivot stud 42ᵇ similar to the stud 42 of the beam 41. Said beam 41ᵇ can be used interchangeably with the beam 41.

Figs. 8 and 9 show a carrier plate or supporting member 47ᵃ for supporting a pair of timbers 46ᵃ which are spaced apart, said plate or member 47ᵃ having a central longitudinal upstanding flange 47' to be disposed between the timbers, thus providing a strong construction. The same swivel joint between the plate 47ᵃ and beam 35ᵃ is used as shown in Fig. 6, the plate having a lower central recess 43ᵃ to receive the upstanding stud 42ᵃ of the beam 35ᵃ, and the lower surface of the plate 47ᵃ is inclined in all directions from the recess 43ᵃ to the edges or margin of the plate, to permit the plate to rock on the beam.

Fig. 10 shows a simple carrier plate or supporting member 47ᵇ having the lower recess 43ᵇ to engage on the pivot stud 42ᵇ of the beam 35ᵃ as shown in Figs. 6 and 8.

Figs. 11 and 12 illustrate a modified connection between the beam 27ᵃ, axle 24ᵃ and tongue 52ᵃ. The member 25ᵃ is hollow and has the pinch clamp 26ᵃ embracing the axle 24, and the forward terminal of the beam 27ᵃ overlaps and rests on the top of the member 25ᵃ. Said member has an upstanding pivot stud 30ᵃ and the beam 27ᵃ has the recess or opening 31ᵃ receiving said stud and increasing in diameter upwardly to permit the beam and member to oscillate transversely relatively to one another. However, the beam overlapping the member will prevent relative oscillation of the beam and member in longitudinal vertical plane. The bottom of the beam 27ᵃ where it overlaps the member 25ᵃ is convexed as at 32ᵃ, to permit said beam and member to oscillate transversely relatively to one another. The socket 53ᵃ for the tongue 52ᵃ overlaps and is bolted or otherwise secured on the member 25ᵃ in front of the tongue, and draft links 57ᵃ extend under the top of the member 25ᵃ and engage a bolt or pin 57' engaged transversely through the sides of the member 25ᵃ near the forward edge of said member. The draft cable, chain or flexible element is connected to the links 57ᵃ, to apply the strain to the member 25ᵃ and other parts of the truck, the same as in the first form, without using the tongue for transmitting the pulling strain.

The trucks, with their interchangeable carriers or supporting members, are capable of conveniently supporting the timbers 46 on which the house, building or other object is mounted. The terminals 45 of the cross beam 41 being offset downwardly will be located in the same horizontal plane with the carriers or members 47, so that the timbers 46 will be horizontal, without requiring the front portion of the house or building to be raised higher than the rear portion thereof, which has been required by trucks used heretofore. The trucks are freely flexible so that the wheels thereof can adjust themselves to irregularities on the surface travelled over, and intermediate and rear wheels of each truck will follow the path of the front wheels and turns are made conveniently. Not only can the front wheels of each truck be moved under the beam 27, but the front and intermediate wheels and beam 27 can move under the beam 35, thus providing for convenient steering to negotiate turns and to also enable the object to be moved at an angle. Thus, by loosening the tongues of the rear trucks from the timber 60, the front wheels of each truck can be turned at an angle to move the object at an angle to the previous line of movement. This will permit the building to be shifted in different directions so as to be properly positioned when it has been moved to its destination.

As will be noted in Fig. 2, the joint between the beam or carrier 41 and the beam 35 is above the front portions of the wheels 23 closer to the vertical plane of the axle 37 than to the joint between the beams 27 and 35, so that the wheels 23 receive a greater amount of the pressure transmitted by the beam or carrier 41 to the truck than do the wheels 21 and 22. Similarly, the joint between the beams 27 and 35 is located above the front portions of the wheels 22 nearer to the vertical plane of the axle 29 than to the joint between the beam 27 and member 25, so that the wheels 22 receive a greater amount of pressure than the front wheels 21. In other words, the wheels 21, 22 and 23 receive pressures somewhat in proportion to the diameters of the wheels, so that the pressure or weight of the object supported by the trucks is distributed to the wheels of each ruck in at least approximate proportions to the diameters of the wheels. This will facilitate steering, inasmuch as the front wheels can be angled more easily than if greater pressure was exerted thereon, and the larger the wheels the greater is their capacity for supporting the weight imposed thereon.

Having thus described the invention, what is claimed as new is:—

1. A truck of the character described comprising a plurality of pairs of wheels located one behind the other and increasing in diameter from the front wheels rearwardly, an axle for each pair of wheels, means connected to the axles between the wheels of the several pairs and having flexible joints for the angling of the axles about vertical axes relatively to one another and for the oscillation of the axles relatively to one another, and a supporting member carried by said means, said means being arranged for transmitting pressure from said member to the wheels in approximate proportion to the diameters of the wheels.

2. A truck of the character described comprising front, intermediate and rear wheels of increasing diameter from the front wheels rearwardly, a beam connected to the intermediate wheels and having a flexible connection with the front wheels, a beam connected with the rear wheels and having a flexible connection with the first named beam, and a supporting member having a flexible connection with the second named beam, the two last named flexible connections being so arranged that pressure from said member is distributed to the wheels in approximate proportion to the diameters of the wheels.

3. A truck of the character described comprising front, intermediate and rear pairs of wheels of increasing diameter from the front wheels rearwardly, each pair of wheels having an axle, a member between the front wheels engaging the axle thereof, a beam between the intermediate wheels engaging the axle thereof and having a swivel joint with said member, a beam between the rear wheels engaging the axle thereof and having a swivel joint with the firstnamed beam, and a supporting member having a swivel joint with the secondnamed beam, said swivel joints being so arranged that pressure from the supporting member is distributed to the wheels in approximate proportion to the diameters of the wheels.

4. A truck of the character described comprising front, intermediate and rear pairs of wheels of increasing diameter from the front wheels rearwardly, each pair of wheels having an axle, a member between the front wheels engaging the axle thereof, a beam projecting between the intermediate wheels and engaging the axle thereof, said member and beam having a swivel joint for the relative turning movements of said member and axle about a vertical axis and permitting said member and beam to oscillate transversely, a beam projecting between the rear wheels and engaging the axle thereof, the secondnamed beam projecting over the firstnamed beam and said beams having a swivel joint for the relative turning movements of the beams about a vertical axis and permitting the beams to oscillate relatively to one another, and a supporting member having a swivel joint with the secondnamed beam for turning and oscillatory movements relatively to the secondnamed beam, said swivel joints being so arranged that pressure from the supporting member is distributed to the wheels in approximate proportion to the diameters of the wheels.

5. A truck of the character described comprising a beam, wheels supporting said beam, and a member supported by said beam, said member and beam having a swivel joint including a recess and a stud within the recess, said recess being of larger diameter than the stud with a clearance between the wall of the recess and sides of the stud for the movement of the stud in the recess in different directions, and the end of the stud and bottom of the recess being curved for the rocking movement of the member and beam relatively to one another.

6. A truck of the character described comprising front, intermediate and rear wheels, a beam connected to the intermediate wheels and having a flexible joint with the front wheels, a beam connected to the rear wheels, the beams having interengaging joint portions flexibly connecting the beams, and a supporting member on the secondnamed beam, said supporting member and secondnamed beam having interengaging joint portions similar to the aforesaid joint portions for flexibly connecting said member with the secondnamed beam and permitting the supporting member to similarly engage the firstnamed beam when the secondnamed beam is removed therefrom.

7. A truck of the character described comprising a longitudinal beam, wheels supporting said beam, and a cross beam extending across the firstnamed beam and having a swivel joint therewith, the terminals of the cross beam being offset downwardly to a horizontal plane close to said joint.

8. A truck of the character described comprising front, intermediate and rear pairs of wheels each having an axle, a member between the front wheels engaging the axle thereof, a beam extending between the intermediate wheels and engaging the axle thereof, the forward end of said beam bearing on said member and said member and beam having a swivel joint permitting said member and beam to turn relatively about a vertical axis and also arranged to permit said member and beam to oscillate transversely relatively to one another, a beam having its rear end extending the rear wheels and connected to the axle thereof, the forward end of the secondnamed beam extending over the firstnamed beam and bearing thereon, the beams having a swivel joint for the turning movement of the beams relatively to one another about a vertical axis and also permitting the beams to oscillate relatively to one another, and a supporting member bearing on the secondnamed beam, said supporting member and secondnamed beam having a swivel joint permitting them to turn relatively to one another about a vertical axis and to oscillate relatively to one another in different directions.

9. A truck of the character described comprising front, intermediate and rear wheels, a beam connected to the intermediate wheels and having a swivel joint connection with the front wheels, a beam connected to the rear wheels, each beam having an upper recess, the secondnamed beam having a depending stud to engage in the recess of the firstnamed beam for turning and oscillatory movements of the beams relatively to one another, and a supporting member having a depending stud to engage in either recess for the turning and oscillatory movement of said member relatively to either beam.

10. A truck of the character described comprising front, intermediate and rear wheels, a beam connected to the intermediate wheels and having a swivel joint connection with the front wheels, a beam connected to the rear wheels, each of the beams having an upper recess with a concaved bottom, the secondnamed beam having a depending stud with a convexed end to seat in the recess of the firstnamed beam, and a supporting member having a depending stud with a convexed end to seat in the recess of either beam, said recess being of larger diameters than said studs.

11. A truck of the character described including two pairs of wheels each having an axle, a member secured on the axle of one pair of wheels between said wheels and having an upper recess, and a beam extending between the wheels of the other pair and engaging the axle thereof, said beam having a depending boss seated in said recess, the end of the boss and bottom of the recess being hemi-spherical and the sides of the recess diverging upwardly to permit said member and firstnamed axle to oscillate in the vertical plane of said axle and to turn about the axis of said boss.

12. A truck of the character described including two pairs of wheels each having an axle, a member secured on the axle of one pair of wheels between said wheels and having an upper recess, a beam extending between the wheels of the other pair and engaging the axle thereof, said beam having a depending boss seated in said recess, the end of the boss and bottom of the recess being hemi-spherical and the sides of the recess diverging upwardly to permit said member and firstnamed axle to oscillate in the vertical plane of said axle and to turn about the axis of said boss, said boss having an annular groove adjacent to the end thereof, and a retaining element carried by said member projecting into said wheel and located in the axis of oscillation of said member and beam relatively to one another in the vertical plane of the firstnamed axle.

In testimony whereof I hereunto affix my signature.

SAMUEL P. GRIFFIN.

Witnesses:
M. A. MOYE,
E. M. CONDIT.